United States Patent
Cadarette et al.

(10) Patent No.: US 11,200,041 B1
(45) Date of Patent: Dec. 14, 2021

(54) REMOTE INSTALLATION, CUSTOMIZATION AND DEPLOYMENT OF MAINFRAME COMPONENTS

(71) Applicant: International Business Machines Corporation, Armonk, NY (US)

(72) Inventors: Paul M. Cadarette, Hemet, CA (US); Gregg Andrew Upton, Santa Clara, CA (US); Austin Willoughby, Voorheesville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/881,525

(22) Filed: May 22, 2020

(51) Int. Cl.
  *G06F 8/61* (2018.01)
  *G06F 9/455* (2018.01)
  *H04L 29/08* (2006.01)
  *H04L 29/06* (2006.01)
  *G06F 9/445* (2018.01)

(52) U.S. Cl.
  CPC ............ *G06F 8/63* (2013.01); *G06F 9/44505* (2013.01); *G06F 9/45558* (2013.01); *H04L 63/102* (2013.01); *H04L 67/10* (2013.01); *G06F 2009/4557* (2013.01)

(58) Field of Classification Search
  None
  See application file for complete search history.

(56) References Cited

U.S. PATENT DOCUMENTS

| | | | |
|---|---|---|---|
| 6,405,294 B1 * | 6/2002 | Hayter | G06F 3/0601 711/162 |
| 9,116,768 B1 | 8/2015 | Sawhney | |
| 9,367,305 B1 | 6/2016 | Kumar | |
| 9,672,078 B2 | 6/2017 | Kacin | |
| 10,169,023 B2 | 1/2019 | Ciano | |
| 10,452,372 B2 | 10/2019 | Lundberg | |

(Continued)

FOREIGN PATENT DOCUMENTS

CN    106202429 A    12/2016

OTHER PUBLICATIONS

"CDC Replication Engine for Db2 forz/OS Remote Source," IBM, accessed May 18, 2020, 1 page, <https://www.ibm.com/support/producthub/db2/docs/content/SSTRGZ_11.4.0/com.ibm.cdcdoc.cdcdb2zremote.doc/concepts/overview.html?cp=SSEPGG_11.5.0>.

(Continued)

*Primary Examiner* — Philip Wang
(74) *Attorney, Agent, or Firm* — Peter J. Edwards

(57) ABSTRACT

A method comprises packaging a plurality of mainframe software artifacts into a container image, wherein the plurality of mainframe software artifacts are created via installation of software on a first mainframe system using a mainframe installer configured for a first operating system. The method further comprises running a container, based on the container image, on a container distribution platform that uses a host operating system different from the first operating system; and executing one or more scripts within the container. The one or more scripts are configured to install and configure the packaged plurality of mainframe software artifacts onto a second mainframe system communicatively coupled to the container distribution platform, the second mainframe system running the first operating system.

20 Claims, 5 Drawing Sheets

(56) References Cited

U.S. PATENT DOCUMENTS

| | | | |
|---|---|---|---|
| 2010/0162227 A1* | 6/2010 | Davies | G06F 8/61 |
| | | | 717/173 |
| 2016/0378525 A1* | 12/2016 | Bjorkengren | G06F 9/5088 |
| | | | 718/1 |
| 2018/0074748 A1* | 3/2018 | Makin | G06F 3/0604 |
| 2018/0349610 A1 | 12/2018 | Gupta | |
| 2019/0243628 A1* | 8/2019 | Goldmann | G06F 9/45558 |
| 2019/0294461 A1* | 9/2019 | Woods | G06F 16/14 |
| 2019/0354389 A1* | 11/2019 | Du | G06F 9/45558 |
| 2021/0011816 A1* | 1/2021 | Mitkar | G06F 11/1464 |

OTHER PUBLICATIONS

"ServerPac (entitled with z/OS)" IBM Knowledge Center, accessed May 18, 2020, 2 pages. <https://www.ibm.com/support/knowledgecenter/SSLTBW_2.3.0/com.ibm.zos.v2r3.e0zb100/sepacov.htm>.

Mell et al., "The NIST Definition of Cloud Computing," Recommendations of the National Institute of Standards and Technology, U.S. Department of Commerce, Special Publication 800-145, Sep. 2011, 7 pages.

Willoughby et al., "Data Refresh in a Replication Environment," U.S. Appl. No. 16/830,766, filed Mar. 26, 2020.

* cited by examiner

REMOTE INSTALLATION, CUSTOMIZATION AND DEPLOYMENT OF MAINFRAME COMPONENTS

BACKGROUND

Mainframes are centralized computer systems, deployed in a cluster configuration, that can serve many (e.g. thousands) of users. Mainframes can be used in data centers as transaction servers, database servers, e-mail servers and Web servers, etc. In some modern mainframes, the installation, customization, and deployment of mainframe components or software is accomplished in a more manual process than is customary on a personal computer. For example, on a mainframe running a mainframe operating system, such as the z/OS® operating system (Z/OS is a registered trademark of International Business Machines Corporation, Armonk, N.Y.), a typical installation is performed by dedicated installation professionals, usually a unique, dedicated, team, and can take 20 or more manual steps using a mainframe installer, such as System Modification Program/Extended (SMP/E). After the SMP/E installation, the resulting target libraries are typically handed over to a second team of professionals, who then customize the software to be run as a started task or job on the mainframe system. This customization process is also typically comprised of several manual steps. Despite the upfront burden of such a typical mainframe installation and customization processes, such processes using a mainframe installer enable some important advantages, such as helping ensure system integrity, managing multiple software versions, applying updates/patches (such as program temporary fix (PTF) system modifications), maintaining audit and security records, among others. Hence, the use of a mainframe installer, such as SMP/E, is still the standard method used to install mainframe software.

SUMMARY

Aspects of the disclosure may include a computer-implemented method, computer program product, and system. One example of the computer-implemented method comprises packaging a plurality of mainframe software artifacts into a container image, wherein the plurality of mainframe software artifacts are created via installation of software on a first mainframe system using a mainframe installer configured for a first operating system. The method further comprises running a container, based on the container image, on a container distribution platform that uses a host operating system different from the first operating system; and executing one or more scripts within the container. The one or more scripts are configured to install and configure the packaged plurality of mainframe software artifacts onto a second mainframe system communicatively coupled to the container distribution platform, the second mainframe system running the first operating system.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
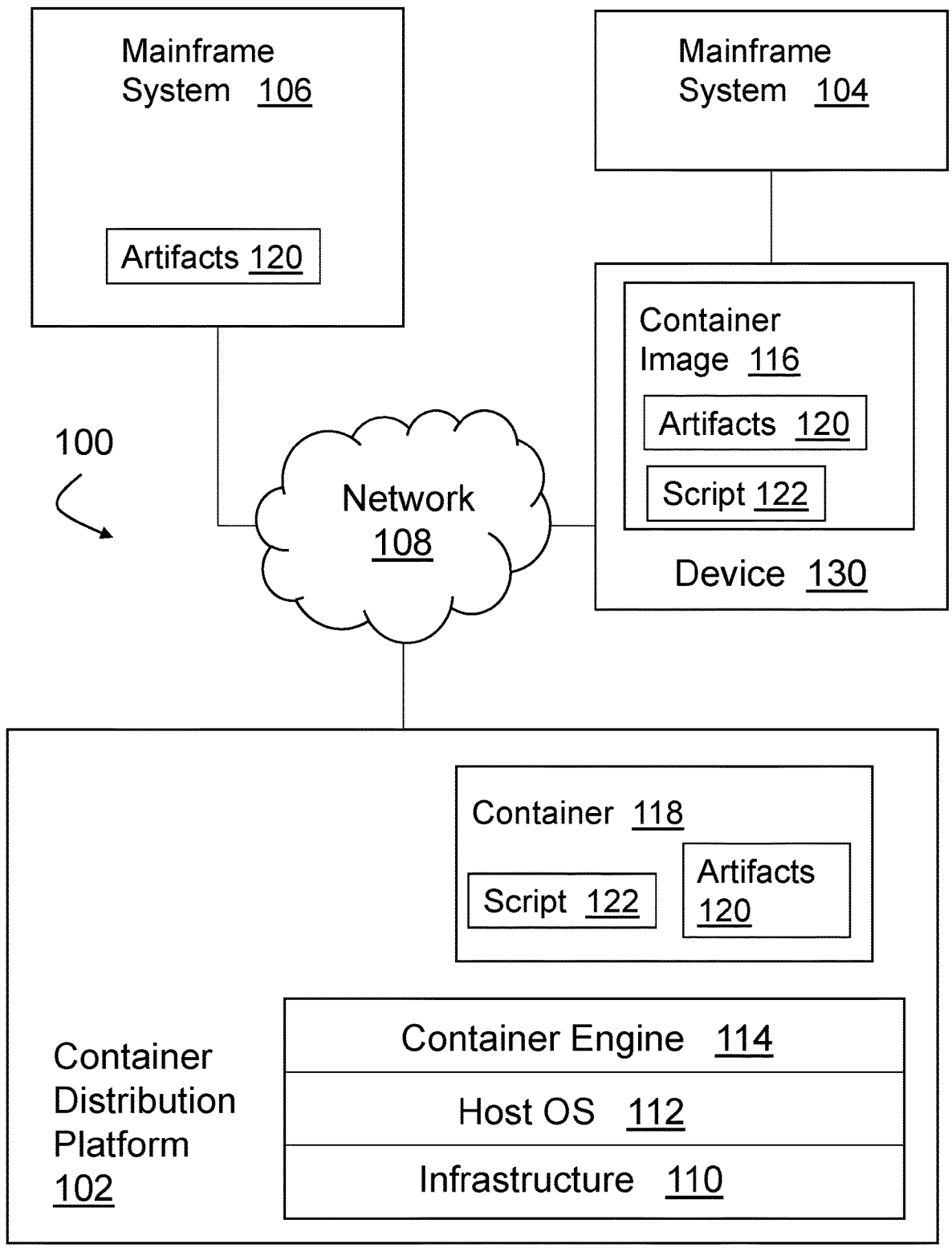
FIG. 1 is a block diagram depicting one embodiment of an example computing environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Despite the benefits of centralized control over mainframe software installation, such as by using System Modification Program/Extended (SMP/E) on a z/Architecture® system running the z/OS® operating system (z/Architecture is a registered trademark of International Business Machines Corporation), there are also disadvantages as alluded to above. For example, the requirement for multiple different users for each customer to coordinate and participate in the installation or modification of software of the respective customer's mainframe can introduce additional costs and delays. These costs and delays can be caused by the number of different individuals that need to participate and the difficulty in coordinating schedules and timing of the different parts of the installation process. Furthermore, after installation using a mainframe installer, additional customization is typically performed by another team to create an operable system in a conventional system. Thus, from a customer perspective, it would be beneficial to be able to install software or apply updates with less manual intervention while still retaining the benefits of typical mainframe installation processes that use a mainframe installer. The embodiments described herein enable remote and automatic installation and/or modification of software on a mainframe system with minimal customer user interaction required during the installation/modification of the software on the customer's mainframe. In addition, the embodiments described herein still enable the benefits (e.g. control and auditability) of using a mainframe installer, such as SMP/E, as described in more detail below. Furthermore, the embodiments described herein enable the automatic customization of the installed software. Thus, the traditionally separate processes of installation and customization which typically involve different teams of professionals are combined into an automatic process through the embodiments described herein. As a result, the embodiments discussed herein provide the control afforded by the mainframe installation/customization processes but make the mechanics simpler without requiring the specialization required of conventional installations.

FIG. 1 depicts one embodiment of an example environment 100 in which the aspects discussed herein can be implemented. Environment 100 includes a first mainframe system 104 (also referred to as a source mainframe system or a product distribution mainframe system) and a second mainframe system 106 (also referred to as a customer mainframe system) each coupled to a container distribution platform 102 via a network 108. The network 108 can include one or more private or public computing networks. For example, network 108 may comprise a private network (e.g., a network with a firewall that blocks non-authorized external access) that is associated with the workload. Alternatively, or additionally, network 108 may comprise a public network, such as the Internet. Thus, network 108 may form part of a packet-based network, such as a local area network, a wide-area network, and/or a global network such as the Internet. Network 108 can include one or more servers, networks, or databases, and can use one or more communication protocols to transfer data to and from the source mainframe system 104 and to/from the customer mainframe system 106. Furthermore, although illustrated in FIG. 1 as a single entity, in other examples network 108 may comprise a plurality of networks, such as a combination of public and/or private networks. The network 108 can include a variety of types of physical communication channels or "links." The links can be wired, wireless, optical, and/or any other suitable media. In addition, the network 108 can include a variety of network hardware and software for performing routing, switching, and other functions, such as routers, switches, base stations, bridges or any other equipment that may be useful to facilitate communicating data. Furthermore, it is to be understood that different systems in the environment 100 can utilize different networks. For example, in some embodiments, mainframe system 104 can be communicatively coupled to the container distribution platform 102 via a local area network or private wide area network whereas mainframe system 106 is communicatively coupled to the container distribution platform 102 via a public network, such as the internet.

The source mainframe system 104 represents a mainframe system of a developer of software to be installed on the customer mainframe system 106. Hence, the customer mainframe system 106 is depicted to represent a customer mainframe system that will receive and apply new or updated software provided by the developer via the container distribution platform 102. It is to be understood that although only one customer mainframe system 106 is depicted in FIG. 1 for purposes of illustration, the mainframe software can be installed and configured on more than one customer mainframe system 106. The developer can use a mainframe installer to install or update software on the mainframe system 104 using conventional techniques. For example, a developer can use SMP/E to install or modify software on the mainframe system 104 running z/OS® operating system. It is to be understood that although SMP/E and z/OS are discussed herein for purposes of explanation, other operating systems and mainframe installers can be used in other embodiments. The installation can be incorporated into part of the build process for the software. As part of the installation performed on the mainframe system 104, software artifacts 120 are generated. The software artifacts 120, as used herein, includes the binaries and all information needed to install and run the software on the customer mainframe system 106.

The artifacts 120 are packaged along with one or more scripts 122 into a container image 116 that resides on a separate device 130 in this example. The device 130, in this example, is a non-mainframe computer system. However, in other embodiments, the container image 116 can reside in a z/CX container or a z/Linux system. Thus, in this example, the source mainframe system 104 is communicatively coupled to the container distribution platform 102 via the device 130. As used herein, a container image is a stand-alone, executable package of a piece of software that includes everything needed to run it: code, runtime, system tools, system libraries, and settings. The one or more scripts 122 can be run to install the artifacts 120 on the mainframe system 106, as described in more detail herein. The artifacts 120 and scripts 122 can be packaged using any suitable containerization technology. For example, in some embodiments, the artifacts 120 and scripts 122 are packaged into a Docker® container image (Docker is a registered trademark of Docker, Inc. in the United States and/or other countries). However, it is to be understood that other containerization technologies can be used in other embodiments. For example, such technologies can include but are not limited to LXC Linux containers, Rancher, and VirtualBox.

Figure 3:
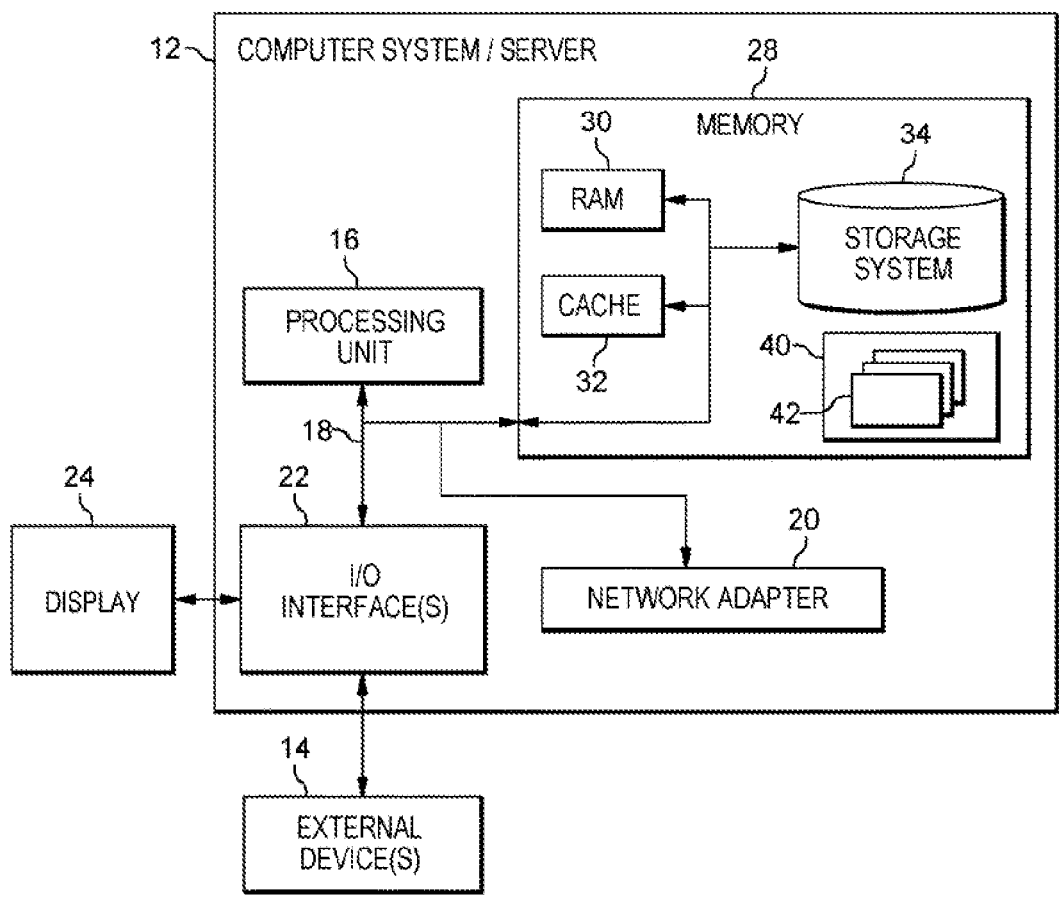
FIG. 3 is a block diagram of one embodiment of an example computer system.

The container image 116 is provided or downloaded onto the container distribution platform 102 via the network 108. Container distribution platform 102 includes a hardware infrastructure 110 executing a host operating system 112 above which a container engine 114 executes. Infrastructure 110 comprises computing resources including computing devices (e.g., servers, processing units), storage systems (e.g., hard disk drives), and networking resources (e.g., network adapters). An example of infrastructure used to implement one embodiment of a container distribution platform is depicted in FIG. 3.

Host operating system 112 executes on infrastructure 110. In this embodiment, the Host operating system 112 is the Red Hat® Enterprise Linux® (RHEL) operating system (offered by Red Hat, Inc., Raleigh, N.C., of which RED HAT and ENTERPRISE LINUX are registered trademarks). However, it is to be understood that other operating systems can be used in other embodiments. Notably, the host operating system 112 is different from the mainframe operating system run by first mainframe system 104 and second mainframe system 106. The container engine 114 creates, manages, and runs the container 118 based on the container image 116. That is, the container 118 can be viewed as an instantiation of the container image 116. Thus, the container 118 includes the artifacts 120 and scripts 122 from container image 116. As discussed above, the artifacts 120 includes the binaries and libraries from the SMP/E installation performed on the first mainframe system 104. As stated above, any suitable containerization technology, such as, Docker, LXC Linux containers, etc. can be used to implement the container engine 114. It is to be understood that the implementation details of running the container 118 and executing the scripts 122 may vary based on the specific embodiment and technology used.

The scripts 122 enable the container 118 to interact with the customer mainframe system 106 to automatically install and configure the software artifacts 120 on mainframe system 106. In particular, as described in more detail below with respect to FIG. 2, the one or more scripts 122 establish a connection with the second mainframe system 106 to upload the artifacts 120 to the second mainframe system 106, create the target libraries, and unpack the binaries in a manner that replicates an SMP/E installation such that the software can be run by the second mainframe system 106 as a result of the actions performed by the one or more scripts 122. Thus, the one or more scripts 122 are configured to do more than simply upload the software artifacts to the second mainframe 106. Rather, the installation performed by the one or more scripts 122 in container 118 is based on the container image 116 which is created as part of an SMP/E install on the first mainframe system 104. Thus, the benefits of an SMP/E install are retained, but little to no interaction from the customer or user of the second mainframe system 106 is required to install the software on the second mainframe system 106. Additionally, the one or more scripts 122 are configured to execute post-installation customization procedures, traditionally performed by a second set of mainframe professionals, that enable the installed software to be run as a mainframe job or service on the second mainframe system 106. Furthermore, it is to be understood that the container 118 can be used to install and/or update software on more than mainframe system even though only one second mainframe system 106 is depicted in FIG. 1, for ease of illustration. Thus, there is a 1:n relationship between the source or product distribution mainframe system and a plurality of customer mainframe systems such that the software artifacts can be installed and customized on hundreds or even thousands of customer mainframe systems using the software artifacts from the single product distribution mainframe system.

Figure 2:
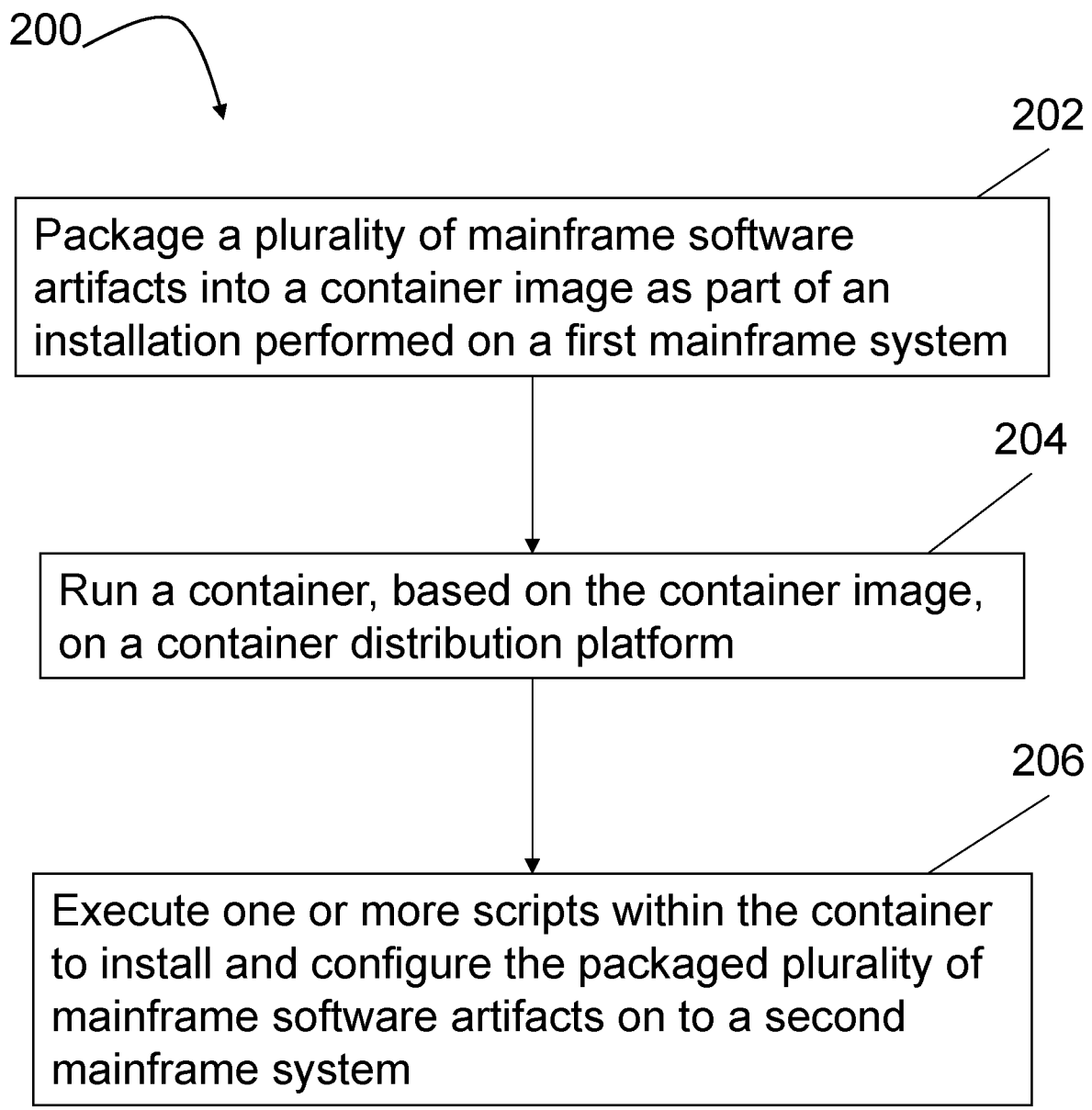
FIG. 2 is a flow chart depicting one embodiment of an example method for remote installation, customization and deployment of mainframe software components.

FIG. 2 is a flow chart depicting one embodiment of an example method 200. Method 200 can be used for enabling the remote installation, customization and deployment of software components. For example, method 200 can enable the remote installation, customization, and deployment of SMP/E managed z/OS components from a cloud computing environment. At least part of method 200 can be implemented by a container distribution platform such as container distribution platform 102 discussed above.

At block 202, a plurality of mainframe software artifacts are packaged into a container image, as discussed above. For example, the mainframe software artifacts can be packaged into a Docker image in some embodiments. The plurality of mainframe software artifacts are created via installation of software on a first mainframe system using a mainframe installer, such as but not limited to SMP/E, configured for a first operating system, such as but not limited to z/OS. The container image can be provided to the container distribution platform from the first mainframe system (or an intermediate device communicatively coupled to both the container distribution platform and the first mainframe system). The container image further includes one or more scripts for installing the packaged plurality of mainframe software artifacts on one or more other mainframe systems, as discussed herein.

At block 204, a container, based on the container image, is run on the container distribution platform. As discussed herein, the container distribution platform utilizes a host operating system, such as but not limited to the RHEL operating system, that is different from the first operating system. In some embodiments, the container distribution platform can be implemented in a cloud environment, as discussed herein. In other embodiments, the container distribution platform is not implemented in a cloud environment. For example, in some such embodiments, the container distribution platform can be implemented as a Linux virtual machine coupled to a second mainframe system via a local area network or a wide area network.

At block 206, the one or more scripts are executed within the container to install and configure the packaged plurality of mainframe software artifacts on to the second mainframe system communicatively coupled to the container distribution platform. In particular, the scripts enable the automated install of the plurality of mainframe software artifacts with minimal to no human user interaction required. Additionally, the second mainframe system is running the first operating system that is the same as the first operating system of the first mainframe system, as discussed herein.

In some embodiments, the plurality of software artifacts installed on the second mainframe system include a log reader agent that is configured to read a set of change logs at the second mainframe system and send the change logs to a target system, such as via a TCP/IP connection, during a replication process. In some embodiments, the log reader agent is configured to send the change logs to the target system by sending the change logs to a data capture service running on a cloud node which collects the data and communicates the collected change logs to the target system. One such example of a distributed replication system is described in more detail in co-pending U.S. application Ser. No. 16/830,766, which is incorporated herein by reference.

The one or more automated scripts that are executed in the container to install the plurality of mainframe software artifacts are configured to transfer files from the container to the second mainframe system during the install process. For example, the files can be transferred using a secure file transfer protocol (SFTP) to a staging directory (e.g. a Unix System Services (US S) directory). After transferring the files, the one or more automated scripts are configured to perform additional procedures and configuration in order to enable the installed software to run on the second mainframe system. Such procedures performed by the one or more automated scripts can include, but are not limited to, customizing the job control language (JCL), performing authorized program facility (APF) authorization for the installation, and/or otherwise setting up the installed software. For example, in some embodiments involving a log reader agent discussed above, the one or more automated scripts can utilize Secure Shell (SSH) scripts to configured and start the log reader agent. In some embodiments, if the one or more scripts do not have sufficient authorization to APF authorize the libraries or if the one or more automated scripts are not configured to perform the APF authorization, the script authorizing the libraries can be separately executed by an authorized user at a later time. Additionally, in other embodiments, the automated scripts can APF authorize the log reader program load libraries such that they have the authority to pull data. In some such embodiments, if the one or more scripts are not authorized to perform the APF authorization or one of the other procedures, the one or more scripts are configured to obtain temporary authorization from a user having sufficient authority.

For example, executing the one or more scripts to install the plurality of mainframe software artifacts can include, in some embodiments, invoking one or more utilities that output a prompt to a user of the second mainframe having sufficient access rights (such as an administrator of the second mainframe) to request that the user input credentials authorizing modifications to the second mainframe system to install the plurality of software artifacts. This prompt can be output each time authorization is required. In particular, in some embodiments, the one or more scripts that are run within the container do not store the credentials or otherwise include a persistent data capture of the credentials.

Thus, through the execution of method 200, the embodiments described herein enable the installation of mainframe software via an automated process while still enabling customization and other benefits of conventional mainframe installers, such as SMP/E, since the installed software artifacts are created through the use of a mainframe installer and then packaged into a container which executes scripts to install the mainframe software artifacts on a remote second mainframe system.

FIG. 3 is a block diagram depicting one embodiment of an example computer system 12, which can be implemented as a container distribution platform. In particular, the computer system 12 can be implemented as a cloud computing node in some embodiments. In other embodiments, the computer system 12 is not implemented as a cloud computing node, as discussed above. Computer system 12 is only one example of a computer system and is not intended to suggest any limitation as to the scope of use or functionality of embodiments described herein. Computer system 12 is capable of being implemented and/or performing any of the functionality set forth herein, such as the functionality discussed above with respect to the method 200 in FIG. 2 and the container distribution platform in FIG. 1.

The computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the components of the example computer system/server 12 include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. For example, the network adapter 20 can be communicatively coupled with the first mainframe system and the second mainframe system via a network as shown in FIG. 1. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, as discussed above, the functionality of the controller can be implemented in a cloud computing environment. However, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
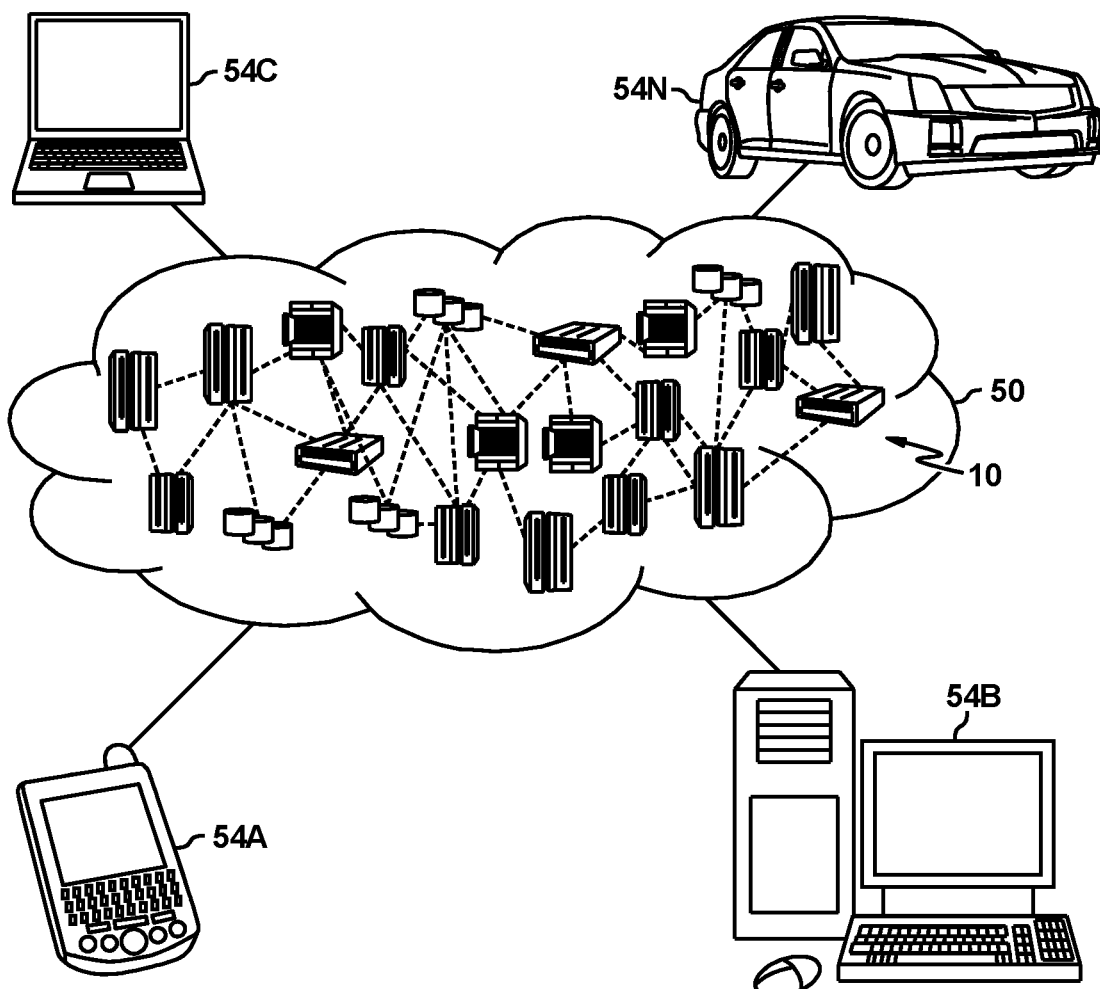
FIG. 4 depicts one embodiment of a cloud computing environment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 5:
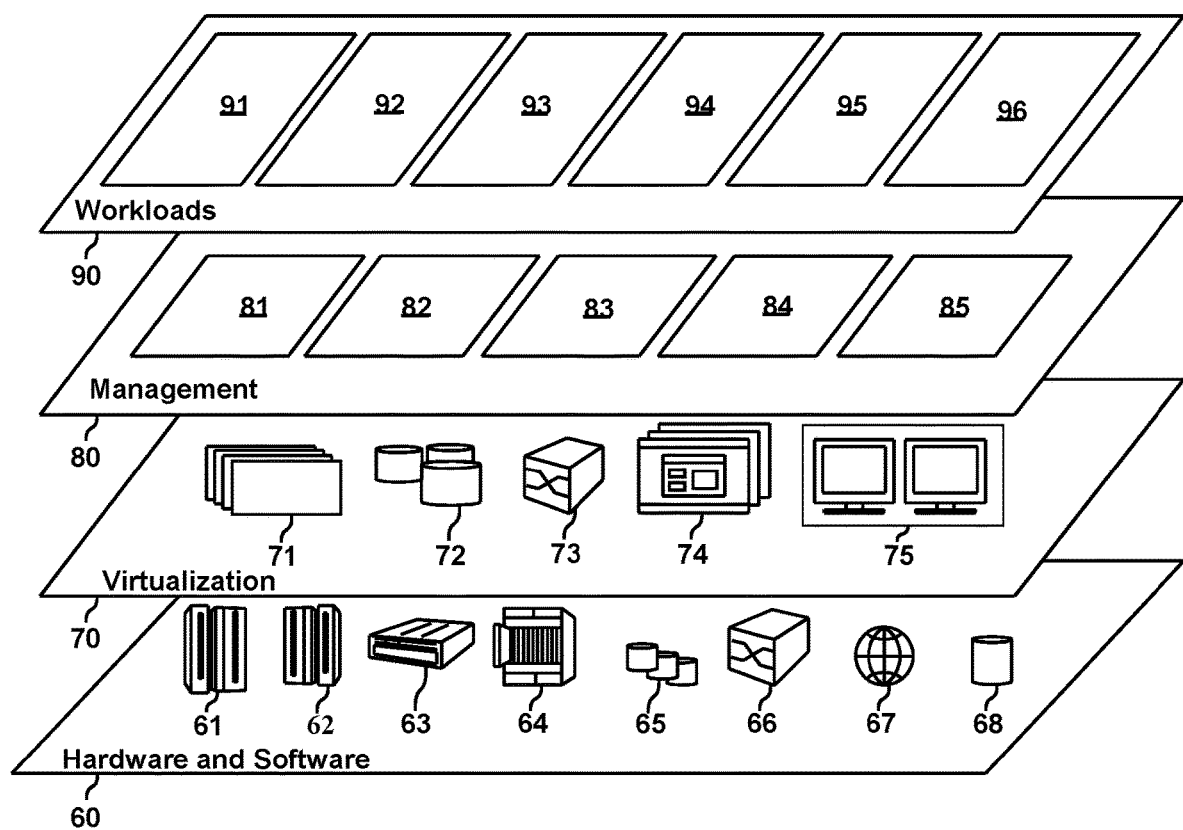
FIG. 5 depicts one embodiment of abstraction model layers.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container distribution platform 96.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In addition, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   packaging a plurality of mainframe software artifacts into a container image, wherein the plurality of mainframe software artifacts are created via installation of software on a first mainframe system using a mainframe installer configured for a first operating system;
   running a container, based on the container image, on a container distribution platform that uses a host operating system different from the first operating system; and
   executing one or more scripts within the container, the one or more scripts configured to install and configure the packaged plurality of mainframe software artifacts onto a second mainframe system communicatively coupled to the container distribution platform, the second mainframe system running the first operating system.

2. The method of claim 1, wherein the first operating system is z/OS and the mainframe installer is a System Modification Program/Extended (SMP/E) installer.

3. The method of claim 1, wherein the container distribution platform is implemented using a Linux virtual machine.

4. The method of claim 1, wherein the container distribution platform is implemented as a cloud computing node in a cloud computing environment.

5. The method of claim 1, wherein executing the one or more scripts includes invoking a utility to output a prompt to request user credentials for installing the mainframe software artifacts on the second mainframe system, wherein the user credentials received via the prompt are not stored by the one or more scripts.

6. The method of claim 1, wherein the plurality of mainframe software artifacts include a log reader agent configured to read a set of change logs at the second mainframe system and send the change logs to a target system.

7. The method of claim 6, wherein executing the one or more scripts includes performing authorized program facility (APF) authorization of the log reader agent such that the log reader agent has authority to pull data.

8. A computer program product comprising a computer readable storage medium having a computer readable program stored therein, wherein the computer readable program, when executed by a processor of a container distribution platform running a host operating system, causes the processor to:
   receive a container image comprising a plurality of mainframe software artifacts, wherein the plurality of mainframe software artifacts are created via installation of software on a first mainframe system using a mainframe installer configured for a first operating system different from the host operating system;
   run a container based on the container image; and
   execute one or more scripts within the container, the one or more scripts configured to install and configure the packaged plurality of mainframe software artifacts onto a second mainframe system communicatively coupled to the container distribution platform, the second mainframe system running the first operating system.

9. The computer program product of claim 8, wherein the first operating system is z/OS and the mainframe installer is a System Modification Program/Extended (SMP/E) installer.

10. The computer program product of claim 8, wherein the container distribution platform is implemented using a Linux virtual machine.

11. The computer program product of claim 8, wherein the container distribution platform is implemented as a cloud computing node in a cloud computing environment.

12. The computer program product of claim 8, wherein the computer readable program is further configured to cause the processor to invoke a utility to output a prompt to request user credentials for installing the mainframe software artifacts on the second mainframe system, wherein the user credentials received via the prompt are not stored by the one or more scripts.

13. The computer program product of claim 8, wherein the plurality of mainframe software artifacts include a log reader agent configured to read a set of change logs at the second mainframe system and send the change logs to a target system.

14. The computer program product of claim 13, wherein the computer readable program is further configured to perform authorized program facility (APF) authorization of the log reader agent such that the log reader agent has authority to pull data.

15. A computer system comprising:
   a network adapter configured to receive a container image comprising a plurality of mainframe software artifacts, wherein the plurality of mainframe software artifacts are created via installation of software on a first mainframe system using a mainframe installer configured for a first operating system different from a host operating system; and a processor communicatively coupled to the network adapter, the processor configured to:

run a container based on the container image; and execute one or more scripts within the container, the one or more scripts configured to install and configure the plurality of mainframe software artifacts onto a second mainframe system communicatively coupled to the network adapter, the second mainframe system running the first operating system.

16. The computer system of claim 15, wherein the first operating system is z/OS and the mainframe installer is a System Modification Program/Extended (SMP/E) installer.

17. The computer system of claim 15, wherein the computer system is implemented using a Linux virtual machine.

18. The computer system of claim 15, wherein the computer system is a cloud computing node in a cloud computing environment.

19. The computer system of claim 15, wherein the processor is further configured to execute the one or more scripts to invoke a utility to output a prompt to request user credentials for installing the mainframe software artifacts on the second mainframe system, wherein the user credentials received via the prompt are not stored by the one or more scripts.

20. The computer system of claim 15, wherein the plurality of mainframe software artifacts include a log reader agent configured to read a set of change logs at the second mainframe system and send the change logs to a target system.

\* \* \* \* \*